United States Patent
Jass (10) Patent No.: US 11,270,312 B1
(45) Date of Patent: Mar. 8, 2022

(54) SYSTEMS AND METHODS FOR COMPUTING AND APPLYING CONSUMER VALUE SCORES TO ELECTRONIC TRANSACTIONS

(71) Applicant: Worldpay, LLC, Symmes Township, OH (US)

(72) Inventor: Nicole S. Jass, Aurora, CO (US)

(73) Assignee: WORLDPAY, LLC, Symmes Township, OH (US)

( * ) Notice: Subject to any disclaimer, the term of this patent is extended or adjusted under 35 U.S.C. 154(b) by 539 days.

(21) Appl. No.: 16/233,627

(22) Filed: Dec. 27, 2018

(51) Int. Cl.
| | | |
|---|---|---|
| *G06Q 30/02* | (2012.01) | |
| *G06Q 20/40* | (2012.01) | |
| *G06Q 30/06* | (2012.01) | |
| *H04L 67/306* | (2022.01) | |

(52) U.S. Cl.
CPC ..... *G06Q 20/4016* (2013.01); *G06Q 30/0201* (2013.01); *G06Q 30/0637* (2013.01); *H04L 67/306* (2013.01)

(58) Field of Classification Search
CPC .......... G06Q 30/0201; G06Q 30/0225; G06Q 30/0248; G06Q 30/0637
See application file for complete search history.

(56) References Cited

U.S. PATENT DOCUMENTS

| | | | | |
|---|---|---|---|---|
| 2010/0317420 A1* | 12/2010 | Hoffberg | ............... | G07F 17/323 463/1 |
| 2015/0073981 A1* | 3/2015 | Adjaoute | ........... | G06Q 30/0225 705/39 |
| 2016/0232546 A1* | 8/2016 | Ranft | ................... | G06Q 40/025 |
| 2019/0287182 A1* | 9/2019 | Chetal | .............. | G06Q 10/06398 |

* cited by examiner

*Primary Examiner* — Azam A Ansari
(74) *Attorney, Agent, or Firm* — Bookoff McAndrews, PLLC (57) ABSTRACT

Systems and methods are disclosed for generating a consumer value score. One method includes: receiving a user identifier associated with a first user; receiving a designation of a period of time for analysis; receiving transaction data associated with the user identifier, the transaction data including a record of one or more transactions, wherein each transaction is associated with the user identifier, a merchant, a transaction time, and a purchase amount; identifying, of the received transaction data, a set of transactions conducted during the received period of time, based on the transaction time of each transaction; identifying, of the set of transactions, purchase data related to a given merchant; determining, of the purchase data related to a given merchant, a value of a purchase amount; and generating a consumer value score based on the determined value of the purchase amount.

18 Claims, 7 Drawing Sheets

SYSTEMS AND METHODS FOR COMPUTING AND APPLYING CONSUMER VALUE SCORES TO ELECTRONIC TRANSACTIONS

TECHNICAL FIELD

The present disclosure relates generally to the field of electronic transactions and, more particularly, to systems and methods for generating consumer analytics and scoring of electronic transactions.

BACKGROUND

As payment security is an increasing concern for users, fraud detection and prevention has become prevalent in technology for payment transactions. At the same time, an error in fraud detection may cost a merchant more than accidently permitting a fraudulent transaction. For example, a merchant may have a customer who regularly purchases goods from the merchant for high amounts. The merchant may lose or frustrate the customer if fraud detection mechanisms erroneously cause the merchant to decline the customer's transactions. A desire thus exists to better understand a customer's value to a merchant, in order for merchants to preserve and improve their relationships with key customers.

SUMMARY

A computer-implemented method is disclosed for generating a consumer value score. The method comprises receiving a user identifier associated with a first user; receiving a designation of a period of time for analysis; receiving transaction data associated with the user identifier, the transaction data including a record of one or more transactions, wherein each transaction is associated with the user identifier, a merchant, a transaction time, and a purchase amount; identifying, of the received transaction data, a set of transactions conducted during the received period of time, based on the transaction time of each transaction; identifying, of the set of transactions, purchase data related to a given merchant; determining, of the purchase data related to a given merchant, a value of a purchase amount; and generating a consumer value score based on the determined value of the purchase amount.

A system is disclosed for generating a consumer value score, the system comprising: a data storage device storing instructions for generating a consumer value score; and a processor configured to execute the instructions to perform a method including the steps of: receiving a user identifier associated with a first user; receiving a designation of a period of time for analysis; receiving transaction data associated with the user identifier, the transaction data including a record of one or more transactions, wherein each transaction is associated with the user identifier, a merchant, a transaction time, and a purchase amount; identifying, of the received transaction data, a set of transactions conducted during the received period of time, based on the transaction time of each transaction; identifying, of the set of transactions, purchase data related to a given merchant; determining, of the purchase data related to a given merchant, a value of a purchase amount; and generating a consumer value score based on the determined value of the purchase amount.

A non-transitory computer readable medium is disclosed for use on at least one computer system containing computer-executable programming instructions for generating a consumer value score, the method comprising: receiving a user identifier associated with a first user; receiving a designation of a period of time for analysis; receiving transaction data associated with the user identifier, the transaction data including a record of one or more transactions, wherein each transaction is associated with the user identifier, a merchant, a transaction time, and a purchase amount; identifying, of the received transaction data, a set of transactions conducted during the received period of time, based on the transaction time of each transaction; identifying, of the set of transactions, purchase data related to a given merchant; determining, of the purchase data related to a given merchant, a value of a purchase amount; and generating a consumer value score based on the determined value of the purchase amount.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Various non-limiting embodiments of the present disclosure will now be described to provide an overall understanding of the principles of the structure, function, and use of systems and methods disclosed herein related to the generation of consumer analytics for products or services placed in online shopping carts. One or more examples of these non-limiting embodiments are illustrated in the selected examples disclosed and described in detail with reference made to FIGS. 1 through 6 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting environments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. either are related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. may be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically may be grouped together to perform a function or group of related functions. Like reference numerals are generally intended to refer to the same or similar components. Components and modules may be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

As payment security is an increasing concern for users, fraud detection and prevention technology has become more sensitive and advanced. At the same time, merchants are trying to present increasingly tailored merchant experiences (e.g., using loyalty cards or special customer loyalty programs). An error or "false positive" in fraud detection may cause a merchant to lose a customer, for example, if a customer is so frustrated or embarrassed at having their card declined, that they do not return to the merchant for any future purchases. In some cases, the error in fraud detection may cost a merchant more (e.g., in lifetime lose revenues associated with the customer) than the cost associated with approving a fraudulent transaction. In such cases, merchants may wish to extend such a customer more trust, in order to provide a better customer experience. In other words, merchants may wish to vary their treatment of users, based on the users' customer loyalty, spending habits, credit record, etc. Accordingly, a desire exists to better recognize each consumer's value to a merchant.

In doing so, authorization or denial of transaction payments may be tailored based on each customer's relation to a particular merchant. One embodiment of the present disclosure involves determining a consumer value score, which can quantify a consumer's "value" to a merchant. In one scenario, a consumer with a high consumer value score may have their transaction approved, even if circumstances of the transaction triggers a possibility of fraud (e.g., a fraud alert or notification). Circumstances of the transaction may include, for example, a location that the consumer is not usually associated with, a price or transaction amount that is unusually large relative to the consumer's typical spending, a product or good that is being purchased that is an aberration from the consumer's typical purchases, or a combination thereof. The consumer may be identified as a valued customer of the merchant with a "high consumer value score" if the consumer's consumer value score exceeds a predetermined score threshold. On the contrary, a consumer with a lower consumer value score (or a consumer value score that falls below a score threshold) may have their transaction denied if the transaction triggers a fraud alert.

Consumer value scores may have additional functions. For example, consumer value scores may provide consumer data (and their value to a merchant), based on the consumer's spending or expected spending for various types of goods. A better understanding of each consumer's expected spending may permit the merchant to improve the consumer's experience, either with increased approval rates for possibly fraudulent transactions, advertisements that may be shown to the consumer, promotions that the consumer may receive, or a combination thereof.

Figure 1:
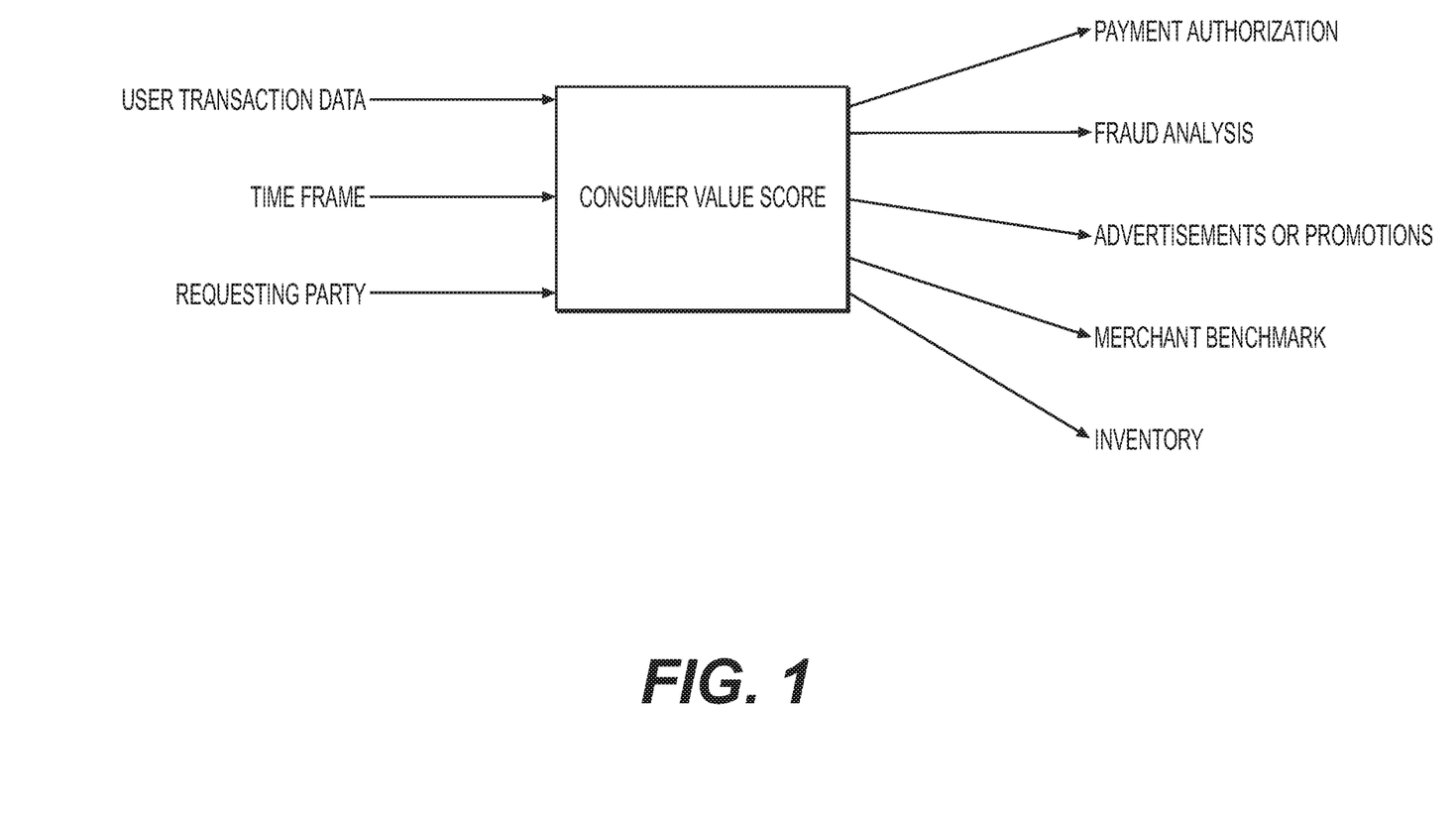
FIG. 1 depicts a scenario generating and employing a consumer value score, according to one or more embodiments.

The presently disclosed system and methods are generally directed to providing a consumer value score. FIG. 1 schematically depicts an overview of the various uses of a consumer value score. In one embodiment, a consumer value core may be based on transaction data, a time frame, and/or a requesting party (e.g., a merchant, a bank, a fraud analysis service, etc.). The consumer value score may be used in various ways. For example, a consumer value score may be used as part of a payment authorization process to approve or deny a transaction/payment request. A consumer value score may also improve or supplement a fraud analysis, for example, in determining a lower risk of fraud if the consumer has a record of having a high consumer value score. In some cases, the consumer value score may also cause a party to provide a consumer with a line of credit or authorize an upper spending limit. For example, a credit card issuer or merchant may authorize credit limits based on a user's consumer value score, either to the merchant or to the credit card issuer.

Further, the consumer value score may be used by merchants to identify which users to target, either to acquire as consumers, or to offer incentives to increase customer loyalty. A consumer value score may help a merchant improve consumer experiences with advertisements or promotions targeted to customers based on their respective consumer value scores. The consumer value score may be used to tailor promotions or advertisements to improve the consumer experience for a given consumer. For example, customers of consumer value scores above a certain threshold may receive particular discounts or notification of special events or promotions, while customers of consumer value scores below the threshold may receive a different set of discounts or advertisements. For example, a merchant website may identify a consumer value score immediately upon a user arriving at or logging into the merchant's website. The user may then be presented with promotions or advertisements based on his/her consumer value score. For instance, a user with a high consumer value score may receive discounts or advertisements for his/her frequently purchased products, while a user with a low consumer value score may receive a stock/default set of advertisements or other experiences tailored to new consumers.

In further embodiments, consumer values scores may help merchants benchmark their performance against competitors or help manage their business (e.g., in providing information on inventory levels or which products/goods are popular). For example, one form of the consumer value score may comprise a user category spend score. The category spend score may refer to the amount that a user spends on a given category of goods, over a given period of time. Insights provided by consumer value score(s) may be given at a greater level of detail by the category spend score. Merchants may benchmark their performance against competitors by comparing a category spend score for a given customer, relative to that customer's category spend score for a competitor. If the customer's category spend score is higher for the competitor, a merchant may wish to adjust their performance. A category spend score may also be used by a merchant to help manage their operations. For example, a category spend score may provide a merchant with insights on the popularity of a product (e.g., how long a product stays shelved or in inventory), whether to re-stock a product, or generally what inventory to keep. The consumer value score may be used to help merchants monitor, replace, or stock inventory since a consumer value score may be related to the amount of merchandise purchased.

In some cases, a consumer value score may be a composite of a user's category spend score. In other cases, a consumer value score may be broken down by their category spend. For example, if a merchant sells a wide range of goods, a consumer may have a one consumer value score in one category of goods (e.g., groceries), and another consumer value score in a different category of goods (e.g., electronics). In summary, the consumer value score may have many different uses. The consumer value score may also take various forms, including a category spend score.

The disclosed embodiments detail systems and methods for generating a consumer value score.

Figure 2:
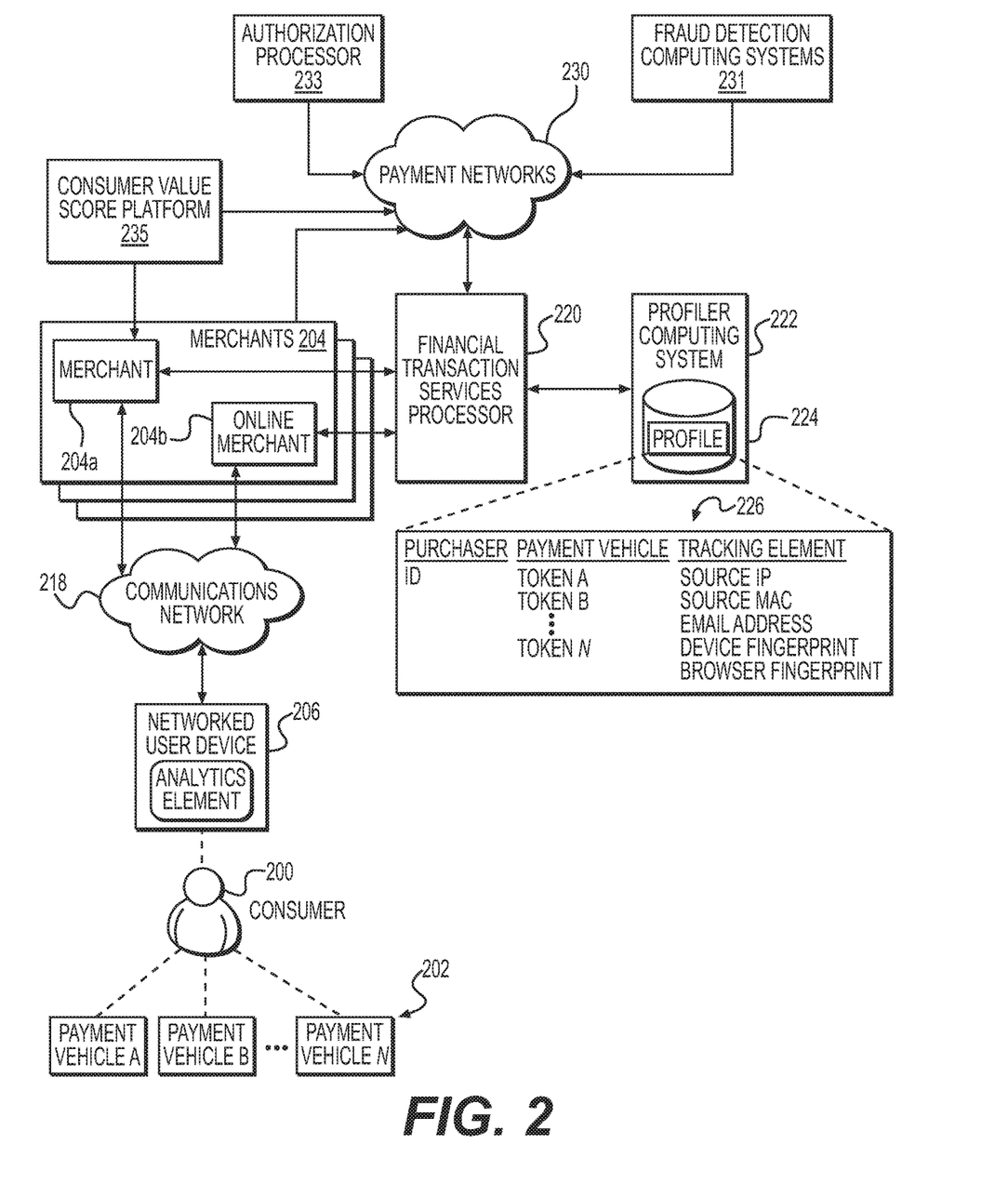
FIG. 2 depicts an exemplary purchase analytics system diagram, according to one or more embodiments.
Figure 3:
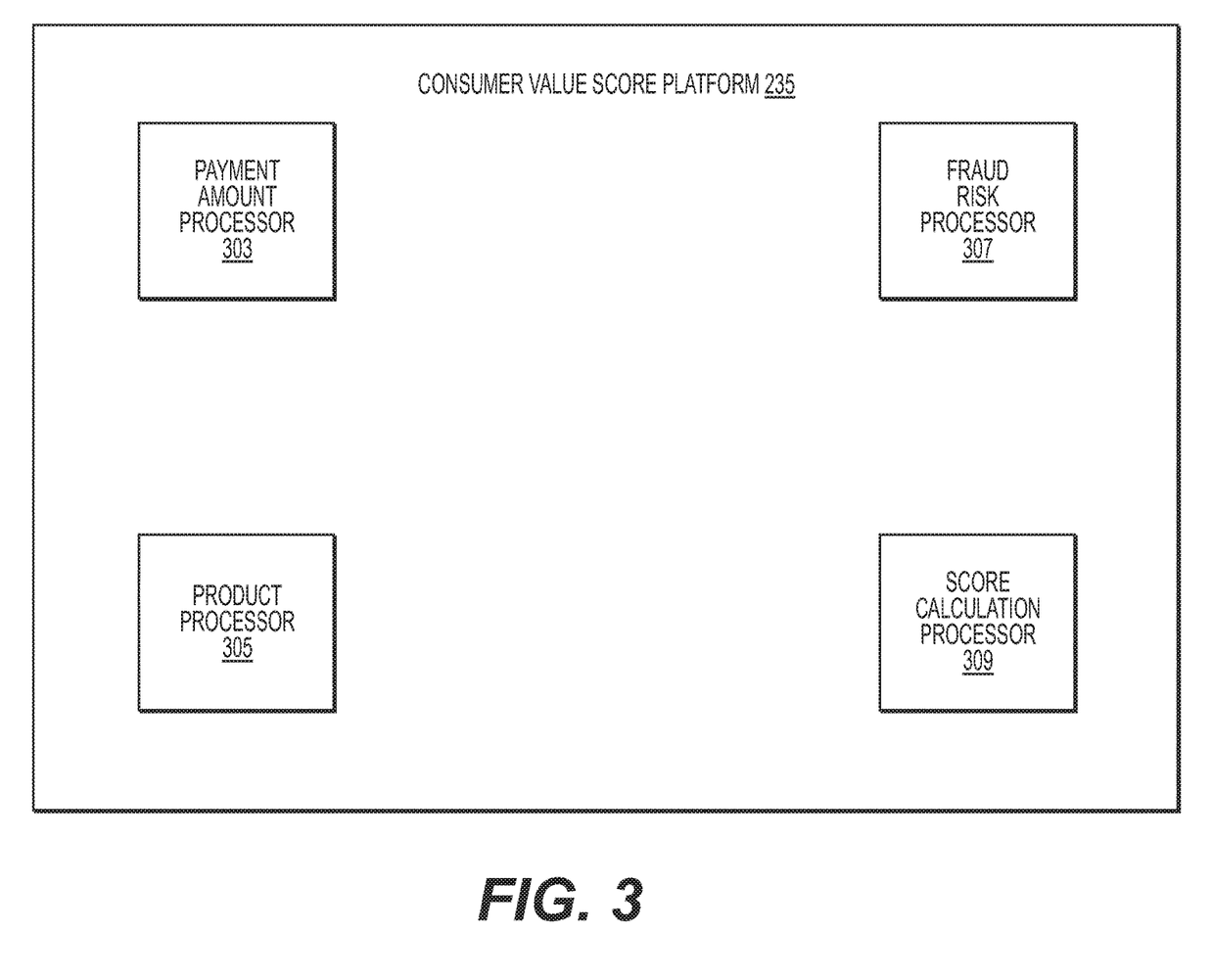
FIG. 3 depicts an exemplary block diagram of a consumer value score platform, according to one or more embodiments.
Figure 4:
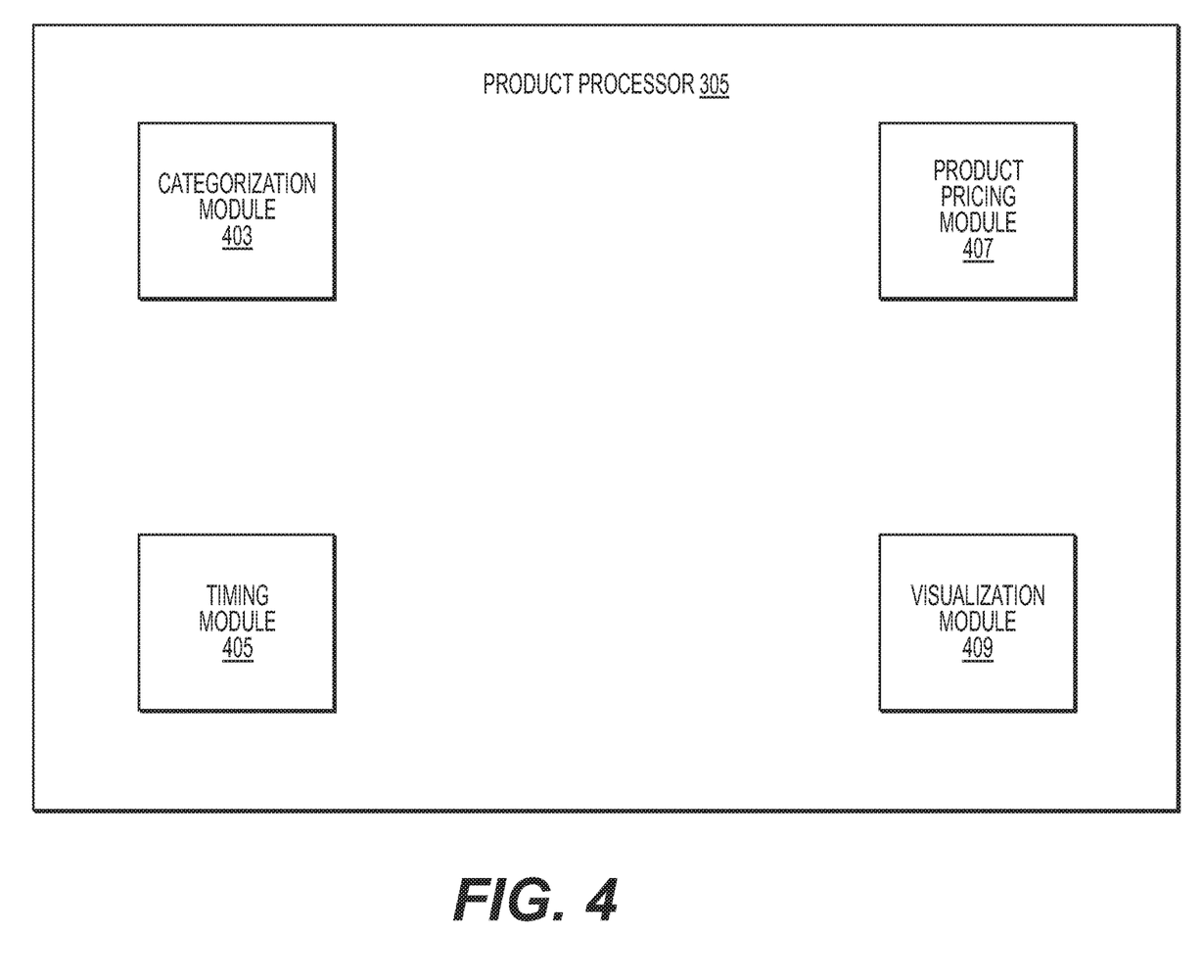
FIG. 4 depicts an exemplary block diagram of a product processor for assessing a user's expenditure per category of products or goods, according to one or more embodiments.

The following disclosure describes the systems, system components, methods, and computing environments for using and computing a consumer value score. In particular, FIG. 2 depicts an exemplary purchase analytics system diagram, in which transaction data may be used to compute a consumer value score. Further, FIG. 2 depicts an exemplary system in which a consumer value score may be used to authorize or deny transactions, e.g., payments for purchases. For example, the purchase analytics system of FIG. 2 may generate and store one or more consumer value score(s) for each user/purchaser detected by the system. The system may further receive a request for a consumer value score when receiving requests to authorize payment (e.g., for a transaction). The system may authorize payments when the consumer value score of a respective user/purchaser exceeds a pre-determined consumer value score threshold, and deny payments when the consumer value score falls below the consumer value score threshold. In some cases, the consumer value score threshold may be dictated by a merchant or financial institution. FIGS. 3 and 4 depict system components for calculating consumer value score(s). The system components of FIGS. 3 and 4 may employ the methods discussed in FIGS. 5A and 5B to generate the computer value score(s).

FIG. 2 depicts an exemplary purchase analytics system diagram, according to one embodiment. In one embodiment, a consumer 200 is shown who is associated with payment vehicles 202, which are depicted as Payment Vehicles A-N. As is to be appreciated, the payment vehicles 202 may include any type of payment vehicle that may be utilized to initiate a payment transaction. Unless otherwise specified herein, "payment vehicle" may include (1) a physical card including a plastic or paper card with a magnetic stripe, bar code, chip, or other indicator indicative of an account number or other account indicative information, (2) a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information, (3) an account access mechanism (e.g., a bar code, quick response (QR) code, etc.). Data associated with the cards or access mechanism may include an encrypted or unencrypted account number or other encrypted or unencrypted account indicative information and/or encrypted or unencrypted information associated with a particular card, issuer, creator, or group of merchants.

It is also contemplated that the card may have multiple embodiments or forms. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using NFC (Near Field Communication) technology or other secure transport technologies to complete the transaction with the selected merchant. Optionally, the virtual card may have a display element (e.g., a bar code or string of numbers) which identifies the account number associated with the card. Alternatively, the virtual card may have display elements relating to the merchants that accept the card. Thus, whether the card is physical or virtual, it communicates account information.

Consumer 200 may utilize a networked user device 206 to communicate with one or more merchants 204 (including brick-and-mortar merchant 204a and online merchant 204b) through a communications network 218 (e.g., the Internet, a secure network, etc.). Consumer 200 may refer to any customer or user who may interface with merchants 204. The networked user device 206 may be any suitable computing device that facilitates network communications, such as, for example, a laptop computer, a tablet computer, a desktop computer, a smart television, a smart appliance, a mobile computing device, a gaming device, a wearable computing device, and so forth. When interacting with merchant 204, networked user device 206 may be associated with an analytics element. The analytics element may be, for example, an IP address, a MAC address, a device fingerprint, a browser fingerprint, or a unique identifier associated with networked user device 206. Additionally or alternatively, the analytics element may be a memory device or data field storing a "user identifier" associated with consumer 200. For example, in some embodiments, the analytics element may be embodied as, or otherwise include, an email address, a postal address, a phone number, a loyalty account number, a username, and/or any other unique identifier associated with consumer 200. Consumer 200 may initiate purchase events with one or more of merchants 204 through a web browser executing on networked user device 206 or through other specialized applications executing on networked user device 206 (sometimes referred to as apps).

Merchant 204 may present a payment interface (e.g., a payment screen, a POS, etc.) to consumer 200 in which information for one or more of payment vehicles 202 is entered. The payment interface can, in turn, communicate with financial transaction services processor 220 with appropriate authorization messaging. Financial transaction services processor 220 may communicate with various payment network(s) 230, to seek authorization for the purchase event at merchant 204, e.g., from fraud detection computing system 231 and authorization processor 233. In some embodiments, financial transaction services processor 220 may include a transaction database that stores transaction data associated with the payment vehicles 202. The transaction data may comprise, for example, merchant IDs, transaction locations, terminal information, source IP addresses, dates and times of transactions, device information, transaction amounts of the purchases, and payment card information. In an example embodiment, the transaction may be for purchase of an item or a service, or for a withdrawal of cash.

Information based on the transaction may also be provided to a profiler computing system 222. In some embodiments, the profiler computing system 222 may be a computing system separate from the financial transaction services processor 220 and operated by a separate entity. In other embodiments, the profiler computing system 222 is a component of the financial transaction services processor 220 and operated by the same entity, e.g., a financial institution (e.g., a bank), a payment issuer (e.g., a credit card company), etc.

The information provided to the profiler computing system 222 may be used to build a profile 226 for consumer 200. The profile 226 may be stored in a profile data store 224. The profile data store 224 may be maintained by the profiler computing system 222, as is shown, maintained by the financial transaction services processor 220, or maintained by any other suitable device or entity, such as a data aggregator computing system. Profile 226 may comprises a unique identifier hash recognizing the profile of an individual, primary account numbers (e.g., PANs) or other identifiers of payment vehicles (e.g. debit, credit cards) associated with the individual, personally identifiable information (PII), and/or data/analysis of an individual's spending habits, geographic area, and fraud activities reported on the cards associated with the individual. In an example embodiment, the personally identifiable information (PII) about the individual involves at least one of his/her name, email address, date of birth, social security number, and physical address.

The format and content of the profile 226 may vary, but generally, the profile 226 provides a linkage of the payment vehicle(s) 202 used during a purchase event to an analytics element (e.g., unique device ID or user ID) of the networked user device 206 and/or the consumer 200. The payment vehicle information as stored in the profile 226 may be tokenized, as may be required by relevant data privacy standards. Over time, as the consumer 200 makes additional purchases with the same or different payment vehicles 202 using the same or different networked user devices 206, the profile 226 may be updated accordingly. Furthermore, in some embodiments, the profile 226 may utilize householding techniques to link a plurality of different purchasers to the same networked user device 206 and/or the same collection of payment vehicles 202.

In one embodiment, fraud detection computing system 231 may be operated by an acquirer processor, issuer processor, card issuer, or any other financial institution. The fraud detection computing system 231 may be operated by another entity or operated independently. In any event, fraud detection computing system 231 may be configured to intercept authorization requests sent across payment network 230, or otherwise receive data about payment transactions sent between merchants 204 and financial institutions. In one embodiment, an authorization processor 233 that handles financial transactions may transfer payment between a financial institution (e.g., financial transaction services processor 220) of consumer 200 and that of merchant(s) 204. Authorization processor 233 may comprise or be operated by an issuer processor, card issuer, or any other payment institution.

In one embodiment, consumer 200 may submit payment information to a payment interface of merchant 204 by entering payment vehicle information (e.g., information related to a credit card, debit cart, fund wiring service, online currency, etc.), accessing stored payment information (e.g., where a user may store his/her payment vehicle information with a user profile or registration on a merchant interface), swiping his/her payment card, inserting his/her chip-based payment card, through wireless near field communication (NFC), through a payment app, via a Quick Response code ("QR" code), etc., or by any other suitable means. The merchant interface may send a payment authorization request by way of payment network 230 to an authorization processor 233 (e.g., at a financial institution). Alternatively, such a request may be sent by a component that controls a flow of a transaction, such as point of sale (POS) engine. The authorization processor 233 may request, by way of payment network 230, an electronic transfer of funds from the received funds to the financial institution associated with merchant 204.

In general, a fraud detection computing system 231 may be operated by an authorization processor (including authorization processor 233), issuer processor, card issuer, or any other financial institution. The fraud detection computing system 231 may be operated by a third party entity or operated independently. In any event, fraud detection computing system 231 may be configured to intercept authorization requests sent across payment networks 230, or otherwise receive data about payment transactions sent between merchants 204 and financial institutions.

In one embodiment, merchant 204 may send (or an acquirer processor may receive) an authorization request for an online or brick-and-mortar transaction over a wireless network, e.g., payment networks 230. Such an authorization request may be intercepted by or otherwise received by fraud detection computing system 231. Fraud detection computing system 231 may retrieve identifying information associated with the transaction and transaction data from the authorization request before the authorization request is routed to a financial institution. The identifying information may include, for example, personally identifiable information (PII) of an individual associated with the transaction, a device fingerprint, device-specific information, an originating IP address, which may be determined through IP proxy piercing, etc. Further, fraud detection computing system 231 may search a profile database, e.g., profile data store 224 for a fraud detection profile associated with the identifying information associated with the transaction.

In an example embodiment, if the fraud detection computing system 231 finds a profile associated with the identifying information associated with the transaction in profile data store 224, an acquirer processor may further analyze the transaction against the profile to determine whether the online or in-store transaction is fraudulent. For example, the fraud detection computing system 231 may compute or retrieve a consumer value score or category spend score of a user, based on the user's profile.

The fraud detection computing system 231 may be configured to detect possible fraudulent behavior if the transaction of the authorization request indicates an aberration from the user's behavior, as given by the user's profile, the user's category spend score, or the user's consumer value score. For example, if a user's average category spend score is $10/month for a given category of goods, but the transaction is for $1,000 of goods in the given category, fraud detection computing system 231 may identify the transaction as possibly fraudulent. The spending irregularities of a user (e.g., consumer 200) may be computed according to the individual's spending habits, geographic area, type of payment used for those payments, etc.

If fraud detection computing system 231 determines that a transaction may be fraudulent, fraud detection computing system 231 may prompt a notification to be sent along with the authorization request, to a financial institution. Authorization processor 233 may cause a financial institution to decline the transaction, according to the notification of fraud sent with the authorization request.

The consumer value score or category spend score may be computed and stored by the consumer value score platform 235. The consumer value score platform 235 may further compute or predict various score(s) for a selected user (e.g., consumer 200) based on data extrapolated from a user profile of the selected user or transaction data of users other than the selected user. In one embodiment, the category spend score may include an average amount that the user spends per month on a category of goods (e.g., groceries, entertainment, toiletries, etc.). The consumer value score platform 235 is described in further detail at FIGS. 3 and 4.

FIG. 3 is a block diagram of an exemplary model of a consumer value score platform 235 for calculating a point value of a customer's value to a merchant, according to an exemplary embodiment of the present disclosure. In one embodiment, consumer value score platform 235 may communicate with cross-issuer fraud detection computing system 231 and authorization processor 233 over payment network 230 (e.g., using any suitable modem, wireless adapter, etc.). The consumer value score platform 235 may receive transaction data, e.g., associated with a given user, and parse the data a variety of ways. The following description includes exemplary ways that consumer value score platform 235 may analyze transaction data. As shown in FIG. 3, consumer value score platform 235 may include a control logic (not shown), payment amount processor 303, product processor 305, fraud risk processor 307, and score calculation processor 309. The control logic may direct the functions and interactions among the various processors, and/or perform one or more capabilities of the various processors.

In one embodiment, the payment amount processor 303 may monitor or receive the total payment amount in each transaction associated with a given user and a given merchant. For example, payment amount processor 303 may detect that a user spends, on average, $100 in each of his/her transactions associated with the given merchant. In one embodiment, payment amount processor 303 may then prompt score calculation processor 309 to generate a consumer value score based on the payment amount associated with the user. The payment amount may be an average amount (e.g., an amount that a user may spend, on average) or an aggregated amount (e.g., the user's total spend over a period of time). For example, a user whose average payment amount totals to $500 may have a higher consumer value score for a given merchant than a user whose average payment amount totals to $100 for the given merchant. A user may have different consumer value scores for each merchant with whom that he/she has transactions.

Alternately or in addition, payment amount processor 303 may further detect the frequency of the transactions of a given user, in association with a given merchant. For example, payment amount processor 303 may detect that a given user spends, on average, $100 in each of his/her transactions associated with a given merchant, and that the user has such transactions with the merchant on a weekly basis. In one embodiment, payment amount processor 303 may then prompt score calculation processor 309 to generate a consumer value score based on a payment amount associated with the user and a given period of time. For example, payment amount processor 303 and score calculation processor 309 may compute a higher consumer value score whose total spend is $100 every week, relative to a user whose total spend is $500, but who may transact with the merchant only once a year.

In one embodiment, product processor 305 may detect which products were purchased, based on received transaction data detailing a given user's transaction(s) with a given merchant. In one embodiment, product processor 305 may then prompt score calculation processor 309 to generate a consumer value score based on the products purchased. In one embodiment, a user's consumer value score for a given merchant may be based on the product(s) purchased by the user. For example, exemplary user, "user A," may have a high consumer value score with a merchant if he/she consistently buys products promoted to the user as part of the merchant's customer loyalty promotions. This may be because User A's behavior may indicate the user's loyalty to the merchant. "User A" may then have a higher consumer value score than "User B," whose purchase patters may be less predictable or less influenced by the merchant.

In one embodiment, fraud risk processor 307 may detect, in any received transaction data, instances of fraudulent behavior or alerts of possible fraudulent behavior. In one embodiment, fraud risk processor 307 may then prompt score calculation processor 309 to generate a consumer value score based on the detected potential or actual fraudulent behavior. In one embodiment, a user's consumer value score may drop if a merchant is at risk of fraudulent behavior when transacting with the user.

In one embodiment, the score calculation processor 309 may calculate a consumer value score characterizing a user's behavior with respect to one or more merchants, as previously described. Score calculation processor 309 may compute a consumer value score based on data collected, identified, or analyzed by the payment amount processor 303, product processor 305, fraud risk processor 307, or a combination thereof.

Score calculation processor 309 may also calibrate each score. Calibration may be based on the average payment amount per transaction of a population of users, including users other than the given user. For example, $100 spent at a craft store may qualify a user to have a high consumer value score since $100 may be an unusually high amount spent at the craft store, based on transactions of other customers of the craft store. Meanwhile, while $100 spent at a furniture store may qualify a user to have a low consumer value score with the furniture store, because other customers typically spend much more at the furniture store. Calibration may also be based on a time period. For example, a user who spends $100 every week at a given store may have a higher consumer value score than another user who spends $1,000 for one transaction with the store, but never purchases from the store again. Score calculation processor 309 may constantly or periodically update consumer value score(s) as transaction data is received, both from a given user, and from users other than the given user. In other words, score calculation processor 309 may generate various types of average consumer value score. One average consumer value score may be the average consumer value score for a particular user, computed based on averaging a given user's spending or purchase habits in association with a given merchant, over the course of many time periods. Another average consumer value score may be the average for a population. For example, a population-based average consumer value score based on purchase data associated with a second user or a population of users, in association with the given merchant.

Calibration performed by score calculation processor 309 may also be used in authorization or denial of transaction (e.g., purchase or payment) approval request. For example, a transaction may be approved if the consumer value score for an individual is greater than a population-based average consumer value score. By extension, a transaction may be denied if the consumer value score for an individual is less than a population-based average consumer value score. In some cases, such an analysis or comparison of consumer value scores may take place upon detection of a risk of fraud.

FIG. 4 is a block diagram of an exemplary model of a product processor for assessing a user's expenditure per category of products/goods, according to an exemplary embodiment of the present disclosure. In one embodiment, product processor 305 of exemplary consumer value score platform 235 may communicate with authorization processor 233 over payment network 230 (e.g., using any suitable modem, wireless adapter, etc.). As shown in FIG. 4, product processor 305 may include a control logic (not shown), categorization module 403, timing module 405, product pricing module 407, and visualization module 409. The control logic may direct the functions and interactions among the various processors, and/or perform one or more capabilities of the various processors.

In one embodiment, categorization module 403 may receive a user's transaction data. Based on the transaction data, categorization module 403 may determine, for each product purchased by a user from a given merchant, a category associated with the given product. For example, categorization module 403 may maintain or include a predetermined listing of various product categories. In one case, categorization module 403 may identify a product purchased by a user from a given merchant. Categorization module 403 may then identify, which category of the various product categories, the purchased product belongs to. For example, categorization module 403 may maintain a listing of product categories including, "groceries," "homeware", "toiletries," etc. Categorization module 403 may receive a user's transaction data in association with a merchant and identify that the user purchased paper towels. Categorization module 403 may then identify that the purchase may be under the category, "toiletries."

In one embodiment, timing module 405 may detect, from received transaction data of a user, the timing of each purchase made by the user from a given merchant. In one embodiment, timing module 405 may aggregate purchase information of a given timeframe. In one scenario, timing module 405 may include a set of default timeframes, e.g., a year (e.g., 2017-2018), a month (e.g., January), a period of time (e.g., the past 6 months), etc. Alternately or in addition, the timeframe evaluated by timing module 405 may be dictated by a user or entity (e.g., a merchant wanting to understand how much a user or a collection of users spends in a set timeframe).

In one embodiment, product pricing module 407 may detect, from received transaction data of a user, the prices of a purchase made by the user from a given merchant. In one embodiment, timing module 405 and product pricing module 407 may receive, from a merchant, a timeframe for evaluation (e.g., where the timeframe could be a month of time). Timing module 405 may then isolate, for a user, all of the user's purchase transactions within the timeframe, e.g., within the month. Product pricing module 407 may then determine, of the purchase transactions identified by and timing module 405 for the given month, the amount that a user spent on a product. For example, timing module 405 and product pricing module 407 may determine that a user spent $20 on bread in a month. For example, timing module 405 and product pricing module 407 may also aggregate purchase information or user analysis, e.g., determining that a user averaged spending $20 on bread for a given year, or determining that a user spent $250 in a year on bread. As a further example, timing module 405 and product pricing module may aggregate purchase information to predict user behavior, for instance, timing module 405 and product pricing module 407 may predict, from a user's past behavior, that the user may spend $20 on bread every month, but spend $50 on bread during December. Such information may help a merchant with inventory and sales predictions. In addition, any deviations or fluctuations in such aggregated data may indicate, to a merchant, possible shifts in a user's loyalty or changes in the user's habits.

In one embodiment, categorization module 403, timing module 405, and product pricing module 407 may work in conjunction to present indications of past or expected user behavior, based on categories of goods. For example, categorization module 403 may detect that "bread" falls into a category of "grains" or "groceries." Timing module 405 and product pricing module 407 may then aggregate pricing information from any received transaction data that falls within a given time period to generate the user's category spend, e.g., identifying that a user spent a given amount in a certain category of goods in a set timeframe. For example, categorization module 403, timing module 405, and product pricing module 407 may aggregate all purchase data that falls into the category of "grains", including the purchase of bread, cereal, oatmeal, pasta, etc., and determine that a user spent $100 per month on grains. Similarly, categorization module 403, timing module 405, and product pricing module 407 may aggregate all purchase data that falls into the category of "groceries", including all raw or semi-prepared food purchases, and generate a user category spend score or indication showing that the user spends $500 per month on groceries. Category spend scores/amounts may overlap. For example, a user's category spend/amount of $500 per month on groceries may include his/her expenditure of $100 per month on grains.

In one embodiment, product pricing module 407 may calculate a user's category spend score/amount using transaction data of a user, which may indicate the actual amount that a user spent in purchasing a product from a given merchant. Alternately or in addition, product pricing module 407 may use a product's list price for calculating a user's category spend score. In some cases, a calculation using a product's list price could be obtained more quickly, since it does not necessarily rely on a user's completed transaction data. In some cases, a user's category spend score could be calculated with the amount that a user actually spent (e.g., given his/her transaction data) and compared to a category spend score calculated based on product list prices. Such a comparison could provide insight into whether a user takes advantage of promotions or price cuts and saves money, or whether the user typically buys similar things regardless of cost.

In one embodiment, visualization module 409 may provide a visualization of the calculations performed by categorization module 403, timing module 405, and product pricing module 407. For example, visualization module 409 may present an array of product categories, individual products, timeframes, etc., prompt a selection of one or more options in the array, and generate a display of a user's purchase behavior based on the selections. The display may include any visual indicators, graphics, pie charts, bar charts, line graphs, scattergrams, colors, numbers, etc. For example, visualization module 409 may include a diagram of a user's purchases in a month, by category. For instance, visualization module 409 may include a bar chart indicating that a user spent $500 on groceries, $200 in restaurants, $100 on electronics, and $50 in gas. Visualization module 409 may further include a pie chat that indicates that of the user's expenditures, he/she spent 58% of the month's expenditures on groceries, 24% in restaurants, 12% on electronics, and 6% on gas. In one embodiment, visualization module 409 may provide a collection of visualizations or a user score in the form on an interactive interface (e.g., via a web portal). In another embodiment, visualization module 409 may provide the visualizations as a report (e.g., in a Portable Document Format (".pdf")).

Alternately or in addition, the visualization module 409 may output a user category spend score/amount or user product spend score/amount, e.g., to a merchant (e.g., merchant 204) or third party without a visual depiction. In one embodiment, a third party may include an advertisement vendor or service, either associated with a merchant or independent of a merchant. A user's category spend score/amount may be used by a merchant or a third party advertisement vendor or service, to target advertisements to the user. For example, advertisements may promote products that fall into one or more categories where a user spends most of his/her money per timeframe. For instance, a user whose expenditures per month are usually on grocery, may receive advertisements on food products, cooking products, or specific products that the user seems to frequently buy, based on received user transaction data. At the same time, a user whose expenditures per month are dominated by fashion or clothing products, may receive advertisements that promote apparel. In this way, a user's category or product spend score/amount may be used to target advertisements shown to the user.

Alternately or in addition, visualization module 409 may output a user category spend score/amount or user product spend score/amount, e.g., to a merchant (e.g., merchant 204), financial transaction services processor 220, profiler computing system 222, fraud detection computing system 231, authorization processor 233, or third party without a visual depiction. For example, a transaction may be approved or denied based on a user's category spend score/amount. For example, if a user's category spend score/amount is about $100 for electronics per month, an aberration in the user spend score/amount may trigger a merchant (e.g., merchant 204), financial transaction services processor 220, fraud detection computing system 231, or authorization processor 233 to deny or prompt the denial of a transaction. For instance, if transaction data indicates an purchase/payment approval request from the user requesting approval of a $2,000 purchase where the user's category spend score/amount has been approximately $100 each month for at least two years, merchant (e.g., merchant 204), financial transaction services processor 220, fraud detection computing system 231, or authorization processor 233 may note the discrepancy and deny the request. At the same time, if transaction data indicates a purchase/payment approval request from the user requesting approval of a $90 purchase where the user's category spend score/amount has been approximately $100 each month, merchant (e.g., merchant 204), financial transaction services processor 220, fraud detection computing system 231, or authorization processor 233 may approve note that the request is consistent with the user's historical behavior, and approve the request.

In some embodiments, transaction approval or denial may be based on a category spend score/amount or product spend score/amount (e.g., calculated by visualization module 409) and a consumer value score (e.g., calculated by score calculation processor 309). For example, a user with a high consumer value score may have his/her transaction approved, even if the transaction would otherwise be denied based on the discrepancy between a transaction approval request associated with the user and the user's category spend score. This may be because the customer may be a valuable, loyal customer to a merchant. The merchant may prefer to approve the transaction to keep the customer's goodwill or to not inconvenience the customer, even if the merchant might be at risk of approving a fraudulent transaction. If a user's consumer value score is not as high, a transaction approval/denial may depend more on the consistency between a transaction approval request and the user's past category spend score/amount because a merchant may be less willing to risk approving a fraudulent transaction.

FIGS. 1-4, and the discussion above provide a brief, general description of a suitable computing environment in which the present disclosure may be implemented. In one embodiment, any of the disclosed systems and/or methods may be executed by or implemented by a computing system consistent with or similar to that depicted in FIGS. 1-4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 5A:
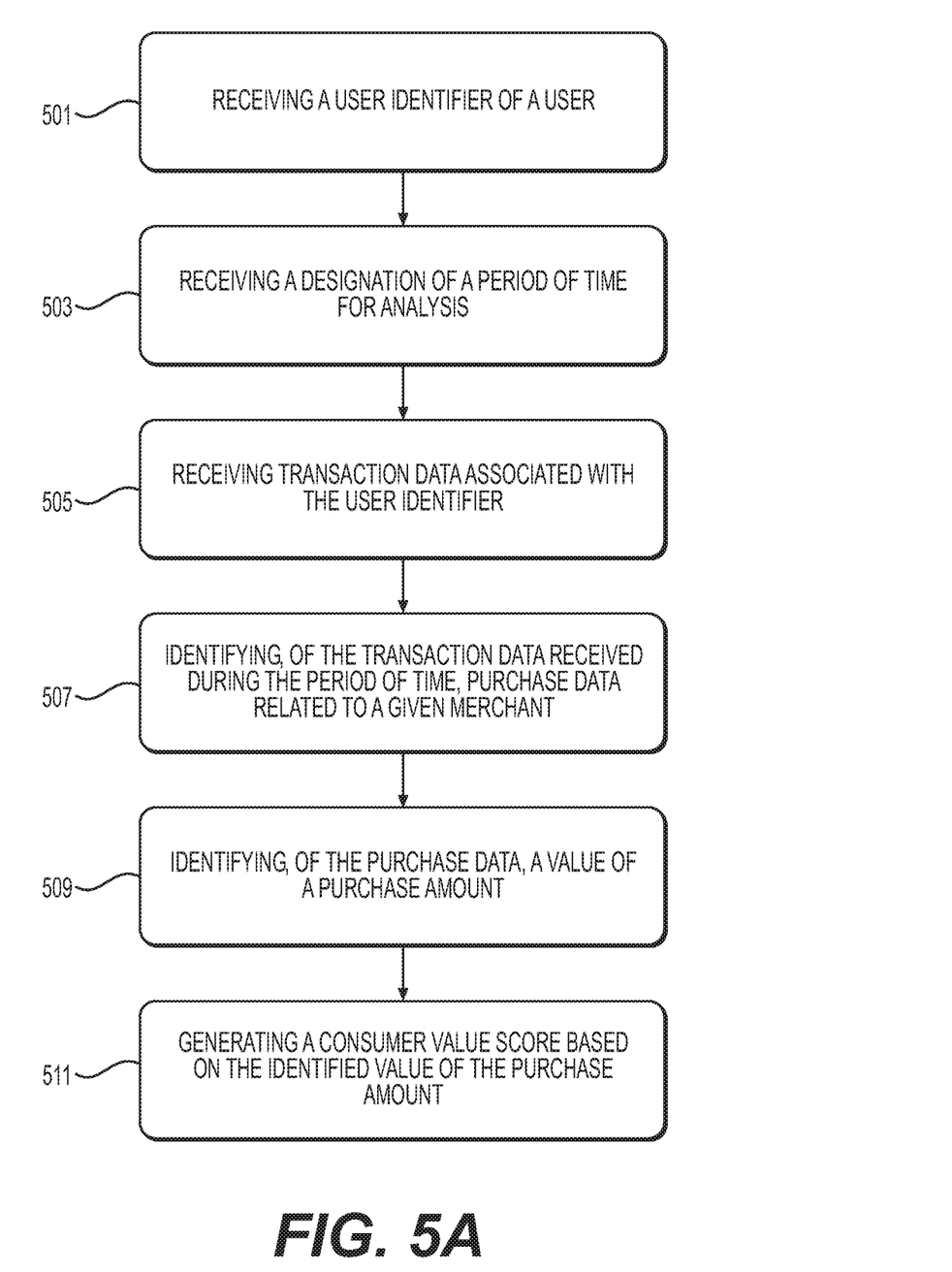
FIG. 5A depicts an exemplary method for generating a consumer value score, according to one or more embodiments.
Figure 5B:
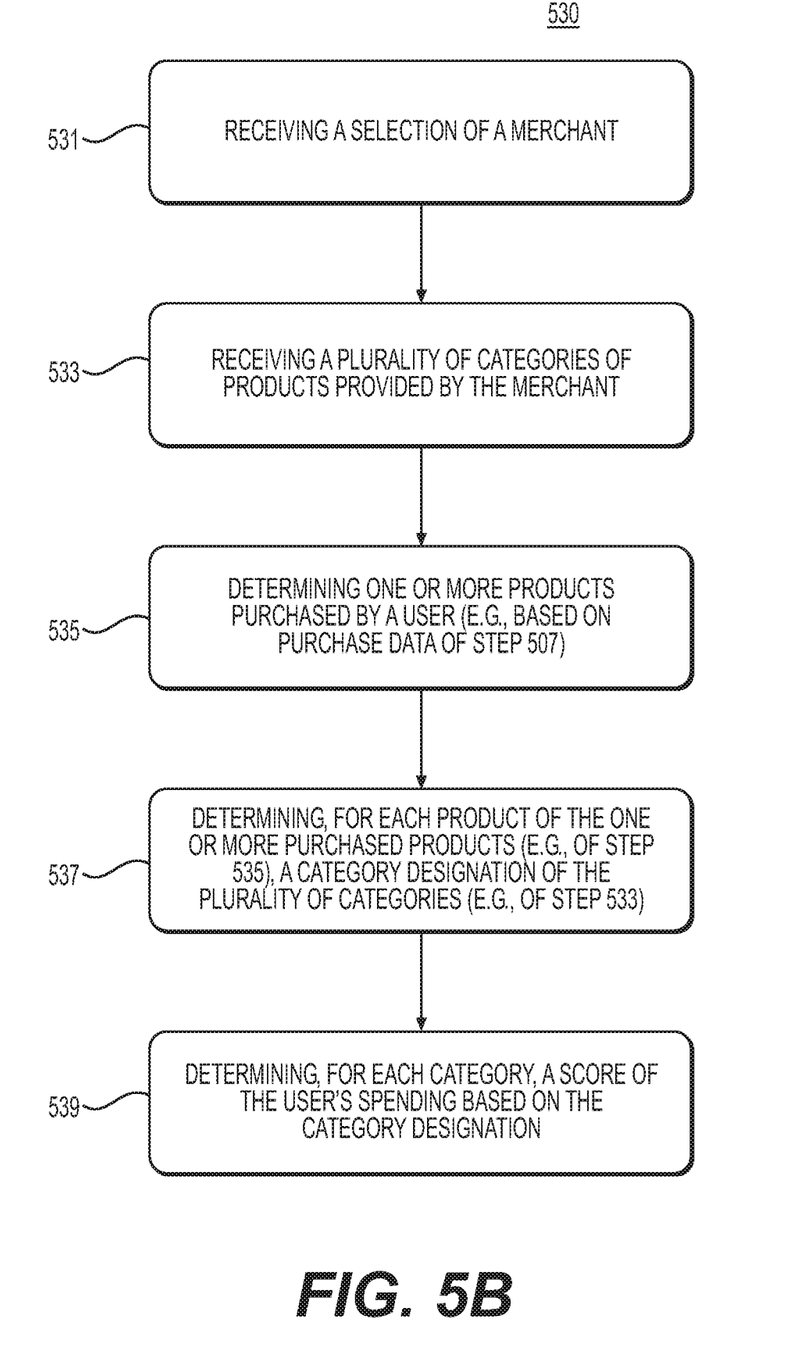
FIG. 5B depicts an exemplary method for generating a consumer category spend score, according to one or more embodiments.

FIG. 5A depicts an exemplary method for generating a consumer value score. FIG. 5B depicts a detailed exemplary method for computing a consumer category spend score. FIG. 5A is a flow diagram of an exemplary method 500 for generating consumer value score, according to an exemplary embodiment of the present disclosure. Step 501 may include receiving identification of a user, where the identification may include any identifier associated with a user, including the analytics element or user profile described for FIG. 2. Step 503 may include receiving a designation of a period of time for analysis, e.g., a timeframe. The time frame may be predetermined, e.g., as part of an initiation of consumer value score platform 235. Alternately or in addition, the time frame may be received from a merchant, e.g., by merchant selection or updated from the initial or default time frame of consumer value score platform 235. In one embodiment, step 505 may include receiving transaction data associated with the user identifier (e.g., of step 501). Transaction data may include a record or log of one or more transactions. In one embodiment, this type of record or log may include an entry for each transaction, including a user identifier, merchant, transaction time (e.g., a time of day), purchase amount, or a combination thereof. Transaction data may further include records of the product/item purchased, the payment vehicle, a user's signature or certification of identify, a location of the purchase, etc. Step 507 may include identifying, of the transaction data during the received time frame (of step 503), purchase data related to a given merchant. For example, step 507 may include identifying, of the received transaction data, a set of transactions conducted during the received period of time, based on the transaction time of each transaction. Step 507 may further include identifying, of the set of transactions, purchase data related to a given merchant.

Step 509 may include determining, of the purchase data related to a given merchant, a value of a purchase amount. In one embodiment, a purchase amount may include a sum of all amounts paid for the transactions during the time frame. Step 511 may include generating a consumer value score based on the determined value of the purchase amount.

FIG. 5B is a flow diagram of an exemplary method 530 for generating user category spend score, according to an exemplary embodiment of the present disclosure. Step 531 may include receiving a selection of a merchant. The merchant selection may include one or more merchants (e.g., merchants 204) in communication with the consumer value score platform 235. Step 533 may include receiving a plurality of categories of products provided by the merchant. In one embodiment, the product categories may be updated in a real-time or a periodic basis, based on the stock provided by the merchant. Step 535 may include determining one or more products purchased by a user (e.g., based on purchase data or transaction data of method 500). Step 537 may include determining, for each product of the one or more purchased products (e.g., of step 535), a category designation of the plurality of categories (e.g., of step 533). In one embodiment, step 539 may include determining, for each category, a score of the user's spending based on the category designation assigned in step 537.

Figure 6:
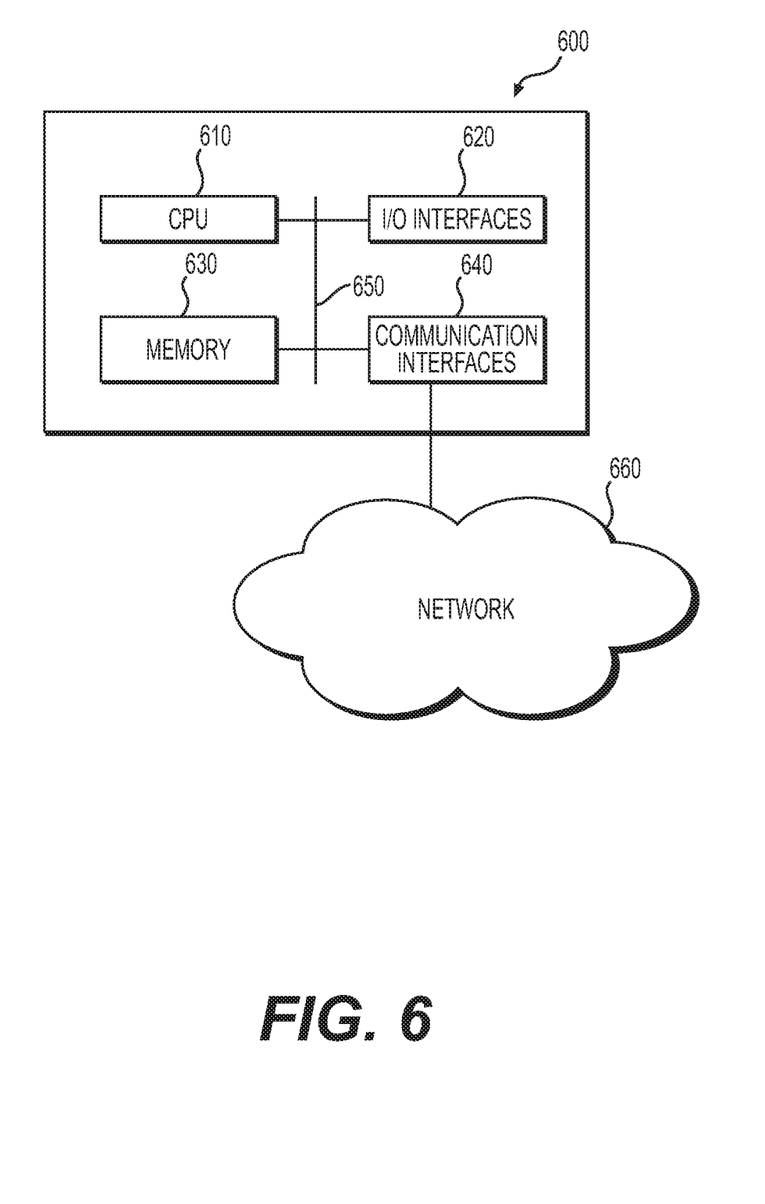
FIG. 6 is a diagram of an example computing environment, according to one or more embodiments.

The systems and processes described above may be performed on or between one or more computing devices. FIG. 6 illustrates an example computing device. A computing device 600 may be a server, a computing device that is integrated with other systems or subsystems, a mobile computing device such as a smart phone, a cloud-based computing ability, and so forth. The computing device 600 may be any suitable computing device as would be understood in the art, including without limitation, a custom chip, and embedded processing device, a tablet computing device, a POS terminal associated with a merchant, a back-office system of a merchant, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 600 may include a processor 610 that may include any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 600 may also include one or more memories 630, for example a read-only memory (ROM), random access memory (RAM), cache memory associated with the processor 610, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 600 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 610, or memories 630 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

One or more networking communication interfaces 640 may be configured to transmit to, or receive data from, other computing devices 600 across a network 660. The network and communication interfaces 640 may include an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 640 may include wire data transmission links such as Ethernet and TCP/IP. The communication interfaces 640 may include wireless protocols for interfacing with private or public networks 660. For example, the network and communication interfaces 640 and protocols may include interfaces for communicating with private wireless networks such as Wi-Fi network, one of the IEEE 802.11x family of networks, or another suitable wireless network. The network and communication interfaces 640 may include interfaces and protocols for communicating with public wireless networks 660, using for example wireless protocols used by cellular network providers, including Code Division Multiple Access (CDMA) and Global System for Mobile Communications (GSM). A computing device 600 may use network and communication interfaces 640 to communicate with hardware modules such as a database or data store, or one or more servers or other networked computing resources. Data may be encrypted or protected from unauthorized access.

In various configurations, the computing device 600 may include a system bus 650 for interconnecting the various components of the computing device 600, or the computing device 600 may be integrated into one or more chips such as programmable logic device or application specific integrated circuit (ASIC). The system bus 650 may include a memory controller, a local bus, or a peripheral bus for supporting input and output device interfaces 620, and communication interfaces 640. Example input and output interfaces or devices 620 include keyboards, keypads, gesture or graphical input devices, motion input devices, touchscreen interfaces, one or more displays, audio units, voice recognition units, vibratory devices, computer mice, and any other suitable user interface.

The processor 610 and memory 630 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems may be made and used. A number of modifications, including substitutions of systems between or among examples and variations among combinations may be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method of generating a consumer value score, the method comprising:
receiving, by a networked user device, a user identifier associated with a first user;
receiving, by a consumer value score platform, a designation of a period of time for analysis;
receiving, by a financial transaction services processor, transaction data associated with the user identifier, the transaction data including a record of one or more transactions, wherein each transaction is associated with the user identifier, a merchant, a transaction time, and a purchase amount;
parsing, by the consumer value score platform, the received transaction data, and identifying a set of transactions conducted during the received period of time, based on the transaction time of each transaction;
identifying, by the consumer value score platform, of the set of transactions, purchase data related to a given merchant;
determining, by the consumer value score platform, of the purchase data related to a given merchant, a value of a purchase amount and a frequency of products purchased, wherein the purchase amount includes an aggregated amount associated with the first user within the period of time;

generating, by the consumer value score platform, a consumer value score based on the determined value of the purchase amount and the frequency of products purchased;

determining, by the consumer value score platform, for each of purchased products, a category designation based on a plurality of categories of products provided by the merchant;

generating, by the consumer value score platform, a user category spend score based on the category designation, wherein the merchant monitors, replaces, and re-stocks an inventory based on the user category spend score;

presenting, by a visualization module, a prompt one or more options for selecting the plurality of categories of products;

generating, by the visualization module, an interactive interface of purchase behavior based on the selection; and approving a potential fraudulent transaction upon determining the consumer value score is above a predetermined score threshold.

2. The method of claim 1, further comprising:
generating the consumer value score based on a fraud risk associated with the first user, wherein the fraud risk includes detected, potential, and actual fraudulent behaviors associated with the first user, and wherein the consumer value score decrease upon determining the detected, potential, and actual fraudulent behaviors associated with the first user.

3. The method of claim 1, further comprising:
determining the potential fraudulent transaction based on unfamiliar location of the transaction that is not associated with the first user, an unusually large transaction amount compared to usual spending of the first user, a type of product purchased that is an aberration from typical purchases of the first user, or a combination thereof.

4. The method of claim 1, further comprising:
prompting a denial of at least one of the one or more transactions based on the generated consumer value score, wherein the generated consumer value score is less than a population-based average consumer value score.

5. The method of claim 1, further comprising:
generating an average consumer value score, based on a second period of time or purchase data associated with one or more second users; and
generating a population-based average consumer value score based on the purchase data associated with the one or more second users; and
approving the potential fraudulent transaction upon determining the consumer value score is above the population-based average consumer value score.

6. The method of claim 1, further comprising:
determining a lower risk of fraud for at least one of the one or more transactions based on a higher consumer value score; and
authorizing an upper spending limit or a line of credit based on the higher consumer value score.

7. The method of claim 1, further comprising:
determining a popularity of one or more products based on the frequency of the products purchased by the first user from the plurality of categories of products.

8. The method of claim 7, further comprising:
generating offers or advertisements based on the consumer value score, wherein the first user with the consumer value score above the predetermined score threshold is provided with discounts, promotions, or notification to special events, and wherein the first user with the consumer value score below the predetermined score threshold is provided with a default set of advertisements tailored to new users.

9. The method of claim 7, wherein the category designation of the purchased products overlaps.

10. A decentralized computer system for generating a consumer value score, the system comprising:
a data storage device storing instructions for generating a consumer value score; and
a processor configured to execute the instructions to perform a method including:
receiving, by a networked user device, a user identifier associated with a first user;
receiving, by a consumer value score platform, a designation of a period of time for analysis;
receiving, by a financial transaction services processor, transaction data associated with the user identifier, the transaction data including a record of one or more transactions, wherein each transaction is associated with the user identifier, a merchant, a transaction time, and a purchase amount;
parsing, by the consumer value score platform, the received transaction data, and identifying a set of transactions conducted during the received period of time, based on the transaction time of each transaction;
identifying, by the consumer value score platform, of the set of transactions, purchase data related to a given merchant;
determining, by the consumer value score platform, of the purchase data related to a given merchant, a value of a purchase amount and a frequency of products purchased, wherein the purchase amount includes an aggregated amount associated with the first user within the period of time;
generating, by the consumer value score platform, a consumer value score based on the determined value of the purchase amount and the frequency of products purchased;
determining, by the consumer value score platform, for each of purchased products, a category designation based on a plurality of categories of products provided by the merchant;
generating, by the consumer value score platform, a user category spend score based on the category designation, wherein the merchant monitors, replaces, and re-stocks an inventory based on the user category spend score;
presenting, by a visualization module, a prompt one or more options for selecting the plurality of categories of products;
generating, by the visualization module, an interactive interface of purchase behavior based on the selection; and
approving a potential fraudulent transaction upon determining the consumer value score is above a predetermined score threshold.

11. The system of claim 10, wherein the processor is further configured for:
generating the consumer value score based on a fraud risk associated with the first user, wherein the fraud risk includes detected, potential, and actual fraudulent behaviors associated with the first user, and wherein the consumer value score decrease upon determining the detected, potential, and actual fraudulent behaviors associated with the first user.

12. The system of claim 10, wherein the processor is further configured for:
determining the potential fraudulent transaction based on unfamiliar location of the transaction that is not associated with the first user, an unusually large transaction amount compared to usual spending of the first user, a type of product purchased that is an aberration from typical purchases of the first user, or a combination thereof.

13. The system of claim 10, wherein the processor is further configured for:
prompting a denial of at least one of the one or more transactions based on the generated consumer value score, wherein the generated consumer value score is less than a population-based average consumer value score.

14. The system of claim 10, wherein the processor is further configured for:
generating an average consumer value score, based on a second period of time or purchase data associated with one or more second users; and
generating a population-based average consumer value score based on the purchase data associated with the one or more second users; and
approving the potential fraudulent transaction upon determining the consumer value score is above the population-based average consumer value score.

15. The system of claim 10, wherein the processor is further configured for:
determining a lower risk of fraud for at least one of the one or more transactions based on a higher consumer value score; and
authorizing an upper spending limit or a line of credit based on the higher consumer value score.

16. The system of claim 10, wherein the processor is further configured for:
determining a popularity of one or more products based on the frequency of the products purchased by the first user from the plurality of categories of products.

17. A non-transitory machine-readable medium storing instructions that, when executed by a server, cause the server to perform a method for generating a consumer value score, the method including:
receiving, by a networked user device, a user identifier associated with a first user;
receiving, by a consumer value score platform, a designation of a period of time for analysis;
receiving, by a financial transaction services processor, transaction data associated with the user identifier, the transaction data including a record of one or more transactions, wherein each transaction is associated with the user identifier, a merchant, a transaction time, and a purchase amount;
parsing, by the consumer value score platform, the received transaction data, and identifying a set of transactions conducted during the received period of time, based on the transaction time of each transaction;
identifying, by the consumer value score platform, of the set of transactions, purchase data related to a given merchant;
determining, by the consumer value score platform, of the purchase data related to a given merchant, a value of a purchase amount and a frequency of products purchased, wherein the purchase amount includes an aggregated amount associated with the first user within the period of time;
generating, by the consumer value score platform, a consumer value score based on the determined value of the purchase amount and the frequency of products purchased;
determining, by the consumer value score platform, for each of purchased products, a category designation based on a plurality of categories of products provided by the merchant;
generating, by the consumer value score platform, a user category spend score based on the category designation, wherein the merchant monitors, replaces, and re-stocks an inventory based on the user category spend score;
presenting, by a visualization module, a prompt one or more options for selecting the plurality of categories of products;
generating, by the visualization module, an interactive interface of purchase behavior based on the selection; and
approving a potential fraudulent transaction upon determining the consumer value score is above a predetermined score threshold.

18. The machine readable medium of claim 17, wherein the method further comprises:
generating the consumer value score based on a fraud risk associated with the first user, wherein the fraud risk includes detected, potential, and actual fraudulent behaviors associated with the first user, and wherein the consumer value score decrease upon determining the detected, potential, and actual fraudulent behaviors associated with the first user.

* * * * *